US006056528A

United States Patent [19]

Lupke et al.

[11] Patent Number: 6,056,528

[45] Date of Patent: May 2, 2000

[54] EXTRUDER HEAD MANDREL SPIDER

[76] Inventors: Manfred A. A. Lupke, 92 Elgin Street, Thornhill, Ontario, Canada, L3T 1W6; Stefan A. Lupke, 32 Vintage Lane, Thornhill, Ontario, Canada, L3T 1X6

[21] Appl. No.: 09/034,241

[22] Filed: Mar. 4, 1998

[30] Foreign Application Priority Data

Jan. 16, 1998 [CA] Canada .................................. 2227161

[51] Int. Cl.[7] ...................................... B29C 47/26

[52] U.S. Cl. ...................... 425/133.1; 425/380; 425/463; 425/467

[58] Field of Search ............................ 425/192 R, 133.1, 425/380, 381, 463, 467

[56] References Cited

U.S. PATENT DOCUMENTS

| | | | |
|---|---|---|---|
| 3,146,495 | 9/1964 | Sanford . | |
| 3,195,865 | 7/1965 | Harder . | |
| 3,266,092 | 8/1966 | Corbett . | |
| 4,584,154 | 4/1986 | Cerny | 425/466 |
| 4,711,623 | 12/1987 | Gross et al. | 425/467 |
| 4,770,618 | 9/1988 | Lupke | 425/133.1 |
| 4,789,327 | 12/1988 | Chan et al. | 425/133.1 |
| 4,826,422 | 5/1989 | Hunter | 425/461 |
| 5,622,732 | 4/1997 | Beckwith | 425/467 |

FOREIGN PATENT DOCUMENTS

| | | |
|---|---|---|
| 1940195 | 3/1971 | Germany . |
| 1553459 | 9/1979 | United Kingdom . |

OTHER PUBLICATIONS

Patent Abstracts of Japan Tosoh Corp: Sanyu Tokushu Seiko KK vol. 096, No. 007, Jul. 31, 1996 & JP 08 080557 A, Mar. 26, 1996.

Patent Abstracts of Japan Bando Chem Ind. Ltd. vol. 097, No. 002, Feb. 28, 1997 & JP 08 281770A, Oct. 29, 1996.

*Primary Examiner*—Harold Pyon
*Assistant Examiner*—Joseph Leyson

[57] ABSTRACT

A spider in an extruder head has a plurality of internal plastic flow passages extending axially through the spider and a spider leg between each flow passage. Each spider leg has upstream and downstream spider leg parts. The upstream part is a flow splitter which splits flow of plastic along the extruder to the spider leg into a plurality of independent plastic streams. The downstream part of the spider leg has a plurality of flow guides staggered at different radial depths in the spider leg with all of the flow guides being directed at one another to guide the bonding of independent plastic streams.

9 Claims, 4 Drawing Sheets

EXTRUDER HEAD MANDREL SPIDER

FIELD OF THE INVENTION

The present invention relates to a spider in an extruder.

BACKGROUND OF THE INVENTION

A conventional mandrel of an extruder head used in extruding double wall plastic pipe is made of a plurality of concentric mandrel tubes which are centered and stabilized relative to one another through the use of a device known in the industry as a spider. The spider provides a spacer to allow the flow of plastic along the tubes past the spider.

The existing spider has spider legs which have an extended diamond shape generally symmetrical to the upstream and downstream sides of the widened center of the spider leg. The front edge of the diamond shape divides the flow of plastic along the mandrel to the spider such that the plastic flows as split streams around the center of the spider leg. The split streams gradually rejoin with one another after they pass the downstream end of the spider leg. The slower the streams rejoin and the less they intermingle with one another adversely affects the ability of the streams to bond to one another.

SUMMARY OF THE INVENTION

The present invention relates to an extruder head spider having spider legs designed to enhance the joining of split streams of plastic flowing around the spider legs.

More particularly, according to the present invention, a spider for an extruder head is provided in which the spider has a plurality of internal plastic flow passages extending axially through the spider and a spider leg between each flow passage. Each spider leg has upstream and downstream spider parts. The upstream part of the spider leg presents a flow splitter which splits flow of plastic to the spider leg into a plurality of independent plastic streams which then flow separately around the spider leg. The downstream part of the spider leg has a plurality of flow guides staggered at different radial depths in the spider leg. All of the flow guides are directed at one another to guide the independent plastic streams to bond with one another after they pass around the spider leg. The staggered positioning of the flow guides provides a very efficient bonding of the independent streams at the downstream end of the spider leg.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION

Figure 1:
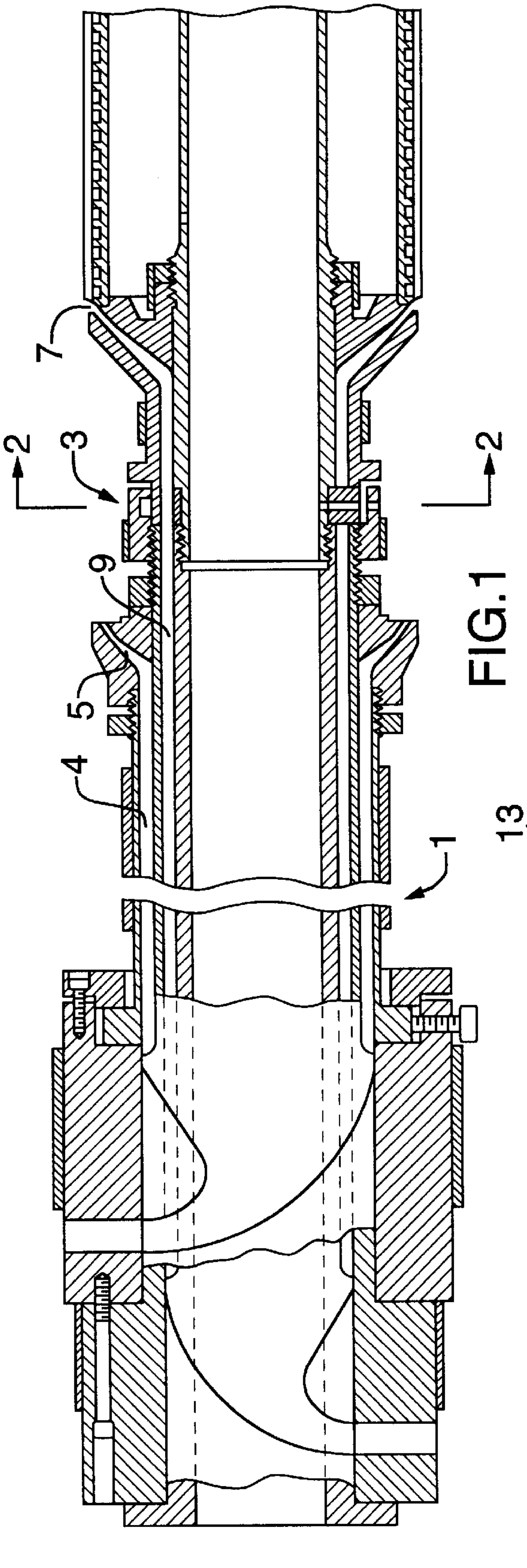
FIG. 1 is a sectional view through an extrusion die mandrel fitted with a spider according to a preferred embodiment of the present invention.

FIG. 1 shows a mandrel generally indicated at 1 of an extruder head. This mandrel is formed of a plurality of concentric tubes as shown. These tubes are centered and stabilized relative to one another by means of a spider generally indicated at 3.

The extruder head mandrel is used for the molding of double wall plastic pipe. One of the walls is produced by a stream of plastic which flows along a plastic flow path 4 terminating in a mandrel orifice 5. As seen in FIG. 1, this orifice is upstream of spider 3.

The mandrel further includes a second path 9 to flow plastic to a second orifice 7 which is downstream of spider 3. Plastic exiting from orifice 7 is used to form an inner pipe wall.

Figure 2:
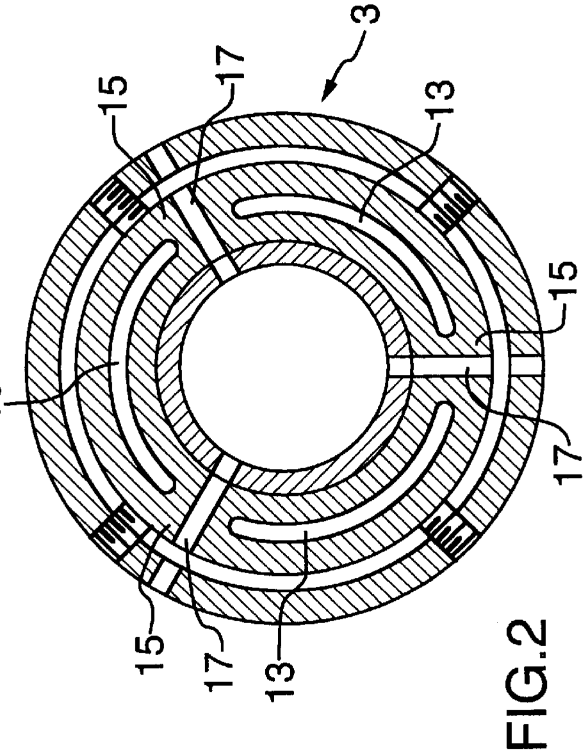
FIG. 2 is a sectional view along lines 2—2 of the spider of FIG. 1.

The plastic flowing along path 9 must pass through the spider. FIG. 2 shows that the spider is provided with a plurality of axially extending plastic flow paths 13 to allow the passage of the plastic through the spider to orifice 7. The flow paths are provided between the different diameter ring portions of the spider which are held together by spider legs 15.

In the embodiment shown, the spider further includes passages 17 extending radially from the hollow center to the outside edge of the spider through the spider legs. These passages can be used for different purposes such as air and/or utility openings.

Figure 3:
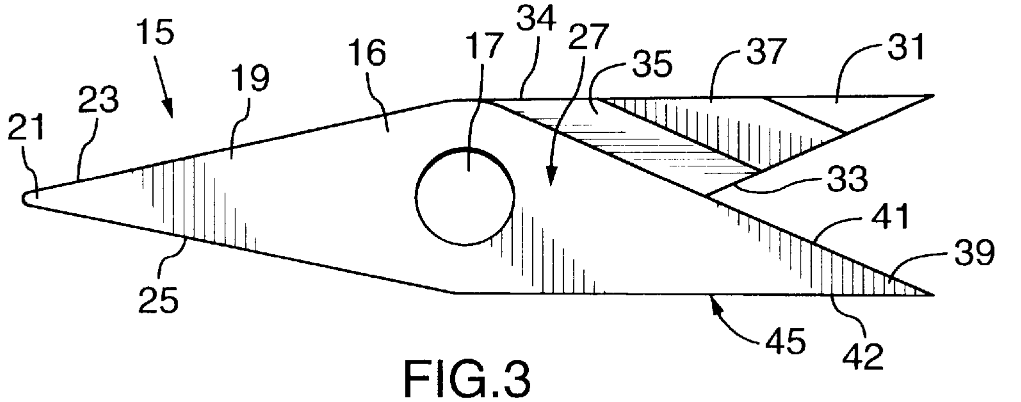
FIG. 3 is an outside view looking down onto one of the spider legs from the spider of FIG. 2.
Figure 4:
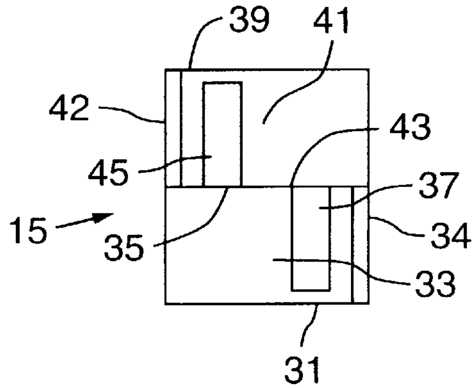
FIG. 4 is a rear or downstream end view of the spider leg of FIG. 3.
Figure 5:
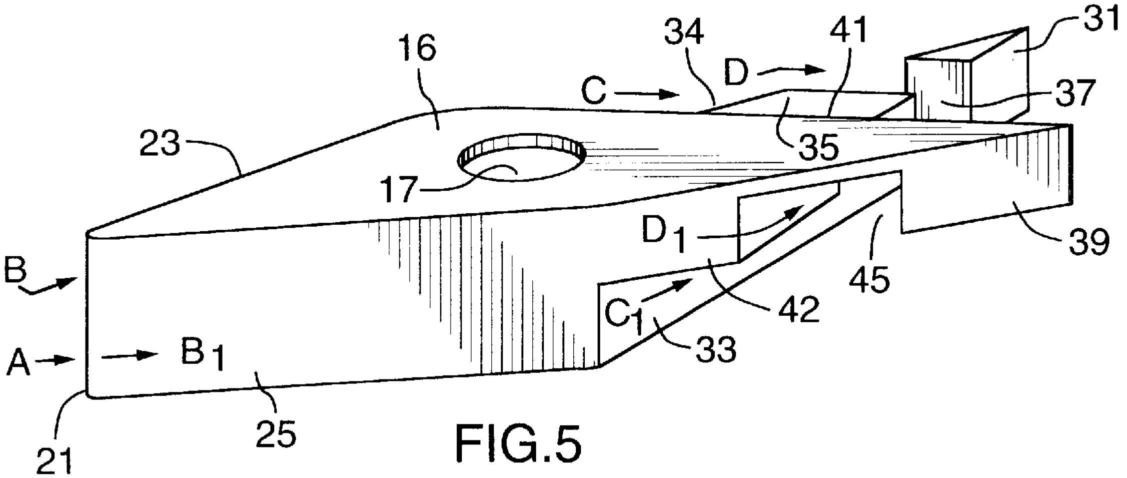
FIG. 5 is a perspective view of the spider leg of FIG. 4.

All of the spider legs are identical in construction and one of them is shown in FIGS. 3, 4 and 5 of the drawings. This spider leg comprises a first spider leg part generally indicated at 19 on the upstream side of the widened center portion 16 of the spider leg. The passage 17 is provided in portion 16. A second spider leg part generally indicated at 27 is provided downstream of spider portion 16.

Spider leg part 19 has a front apex 21 leading to side edge surfaces 23 and 25. The front apex divides plastic stream A which flows along flow path 9 of the mandrel to the spider. The plastic is split by apex 21 into a pair of independent plastic streams B and B1 which then are diverted from one another along the side edges 23 and 25 of the first or front part of the spider leg around air passage portion 16 of the spider leg.

The downstream part 27 of the spider leg is formed by a pair of leg portions 31 and 39. These two leg portions as shown are staggered, i.e. offset from one another and are located as seen in FIG. 4 at different radial depths within the spider.

Leg portions 31 and 39 have been configured to cooperate with one another in acting as guides specifically to direct the flow of the first and second streams of plastic B and B1 at one another after these streams have passed around spider portion 16.

Leg portion 31 of the spider has a flat inside side edge surface 33 which is inclined across the longitudinal axis of the spider leg. Leg portion 31 is further provided with an outside edge surface 34, a face surface which is formed by a flat surface region 35 at right angles to edge surfaces 33 and 34 and further by a channel 37 which borders flat surface 35.

Leg portion 39 has an inside edge surface 41. This side edge surface of the second spider leg portion is inclined across the longitudinal axis of the spider leg in the opposite direction to the inclination of side edge surface 33 on the first spider leg portion 31.

Spider leg portion 39 further includes an outside edge surface 42 and its own face surface at generally right angles to its side edge surfaces 41 and 42. This face surface is defined by a flat surface region 43 and a channel 45 both of which are located radially inwardly of leg portion 39 the face surface of which is located radially outwardly of the side edge surface 33 of leg portion 31.

As earlier described, the plastic impacting the front end of the spider leg is divided into two streams of plastic B and B1 flowing along the edge surfaces 23 and 25 at the front of the spider leg. The first stream of plastic B is fed outwardly around spider portion 16 containing passage 17. Part of this stream is then redirected as stream C along the inside edge surface 41 of spider leg portion 39 across surface 35 of leg 31. The rest of stream B flows as stream D along outside edge surface 34 of leg 31 where it is collected in channel 37 which runs parallel to edge surface 41. Therefore channel 37 redirects stream D to flow together with stream C.

The second plastic stream B1 also flows around spider portion 16 where it divides into streams C1 and D1. Stream C1 flows along side edge 33 of leg portion 31 below stream C and directed at stream D flowing through channel 37. Stream D1 flows along side edge 42 of leg portion 39 where it collects in and is redirected by channel 45 at stream C.

As a result of all of the above, there is a substantial turbulence or breaking down of the original stream A into a host of smaller streams all of which are redirected at one another on the downstream end of the spider leg. This greatly enhances bonding of all of the streams to form a common stream required to form the inner wall of the pipe.

Figure 6:
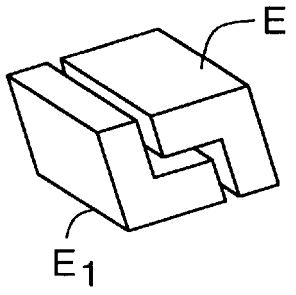
FIG. 6 is a perspective view showing the general look of streams of plastic coming together at the downstream end of the spider leg of FIGS. 3 through 5.

FIG. 6 shows how the plastic generally flows at the downstream end of the spider leg. The two streams B and B1 reunite as steams E and E1 respectively. As will be seen in FIG. 6, these two streams join in an overlapping welding of the two streams which provides a much better bonding than for example a standard butt welding as found with conventional spider legs.

FIGS. 7 through 10 of the drawings show a further preferred embodiment spider generally indicated at 51. This spider is again usable in an extruder and is particularly suited for use in an extruder head mandrel of a pipe forming apparatus used for making double walled pipe. The outer wall of the pipe exits the mandrel upstream of the spider and the inner wall of the pipe is formed by plastic which flows through axially extending flow passages 52 of spider 51.

In this embodiment, the entirety of the spider including its spider legs 57 has a novel construction. The spider itself is made from two separate and distinct rings namely inner ring 53 and outer ring 55 with the plastic flow passages 52 being provided between the two rings. Spider legs 57 act as both spacers and connectors for the two rings 53 and 55.

Figure 7:
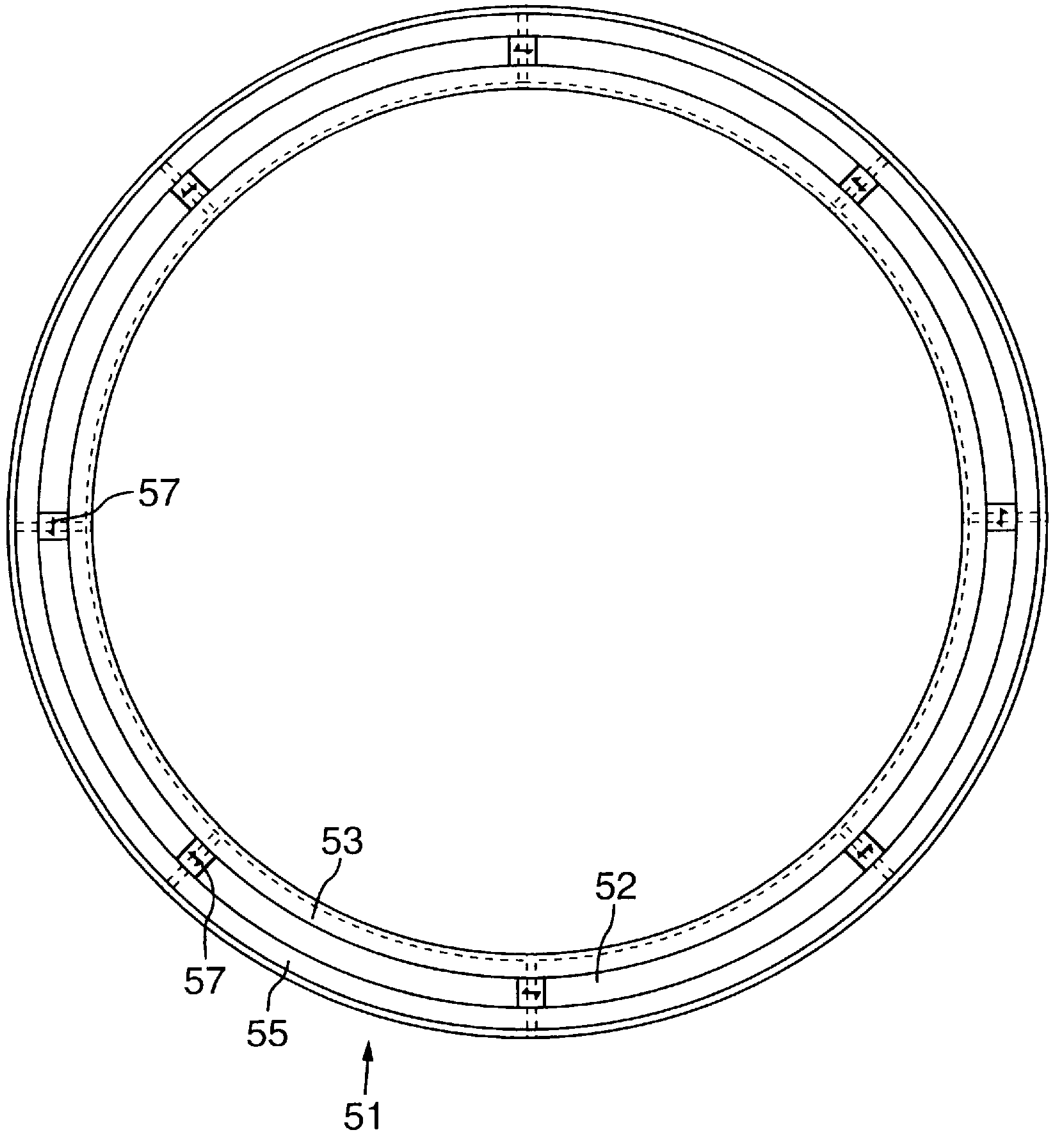
FIG. 7 is an end view of a spider according to a further preferred embodiment of the invention.

As opposed to a solid one piece construction, working with a multiple piece spider as shown in FIG. 7, enables the interior and exterior ring to be finished separately from one another. It also enables separate finishing of the spider legs. Therefore, all exterior surfaces of all three parts are readily accessible for finishing purposes substantially enhancing the flow of plastic through the spider.

Figure 9:
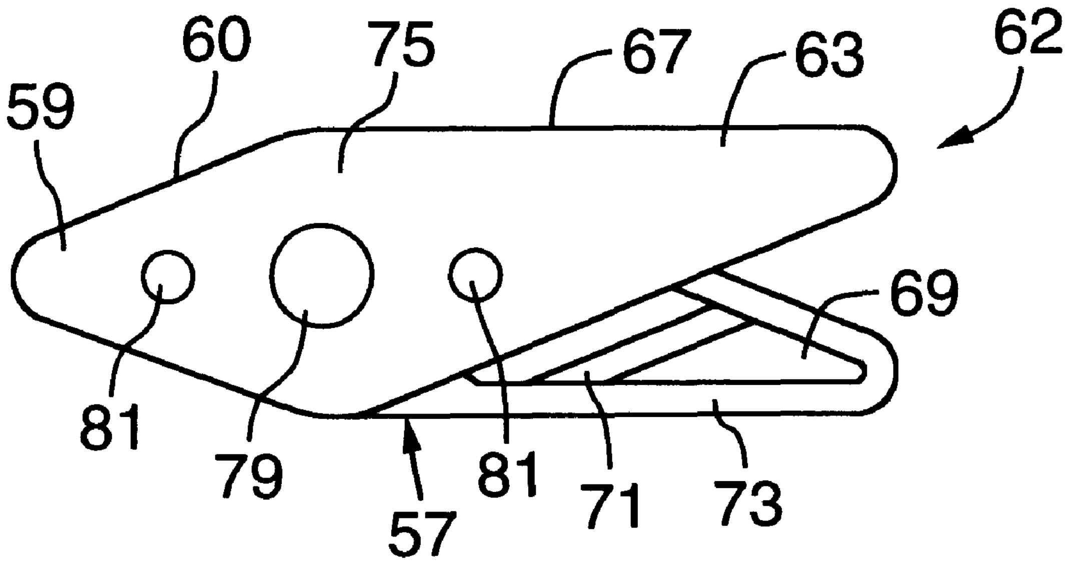
FIGS. 9 and 10 are top and side views respectively of one of the spider legs from the spider of FIG. 7.
Figure 10:
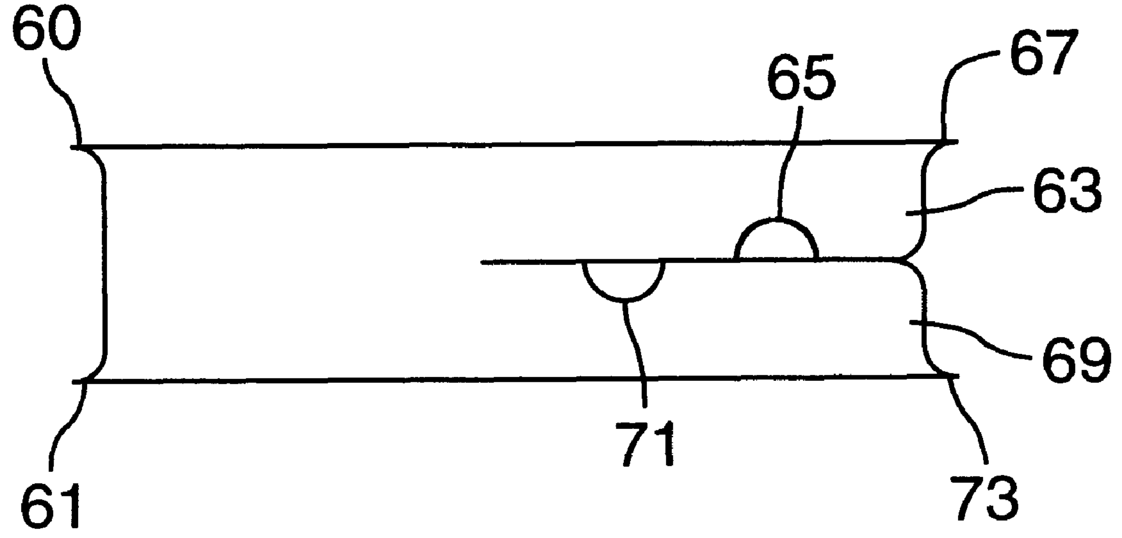

FIGS. 9 and 10 show one of the spider legs 57 from spider 51. It should be noted that all of the remaining spider legs have the same construction as that shown in FIGS. 9 and 10.

Spider leg 57 once again has a downstream end with radially staggered flow guides as earlier described with respect to spider leg 15. In this particular case, spider leg 57 has an upstream end 59 and a downstream end generally indicated at 62. The downstream end is formed by separate leg portions 63 and 69.

Figure 8:
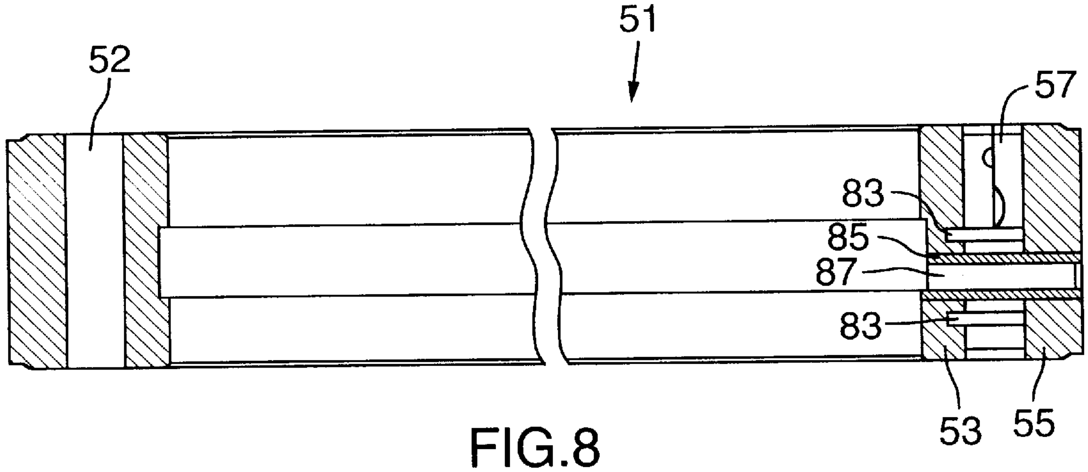
FIG. 8 is a side edge view of the spider of FIG. 7.

Spider leg 57 has a widened body portion 75 with a through passage 79 which provides access through the spider once again for different functions such as air and utilities. In this particular case, opening 79 is bordered to opposite sides by a further pair of smaller openings 81. These openings are used to receive dowel pins 83 shown in FIG. 8 of the drawings to hold the two rings 53 and 55 together with one another. FIG. 8 also shows a sleeve 85 fitted through the passage 79 in the spider leg. This sleeve is substantially taller than and projects both above and below the spider leg. In fact, sleeve 85 is sufficiently long that it projects through both the inner and outer spider rings to not only provide a passage 87 from the inside to the outside of the spider leg but to additionally stabilize the securing of the two rings relative to one another.

The mechanical fasteners described above, i.e. dowel pins 83 and sleeve 85 are accessible to release the spider legs from the spider rings. This enables dismantling of the spider which is very beneficial should one of the spider parts become damaged or otherwise require servicing. Only the affected part needs to be replaced rather than requiring an entire new spider as is the case with a conventional one piece spider.

Spider leg 57 has a number of additional features to enhance the flow of plastic around the spider leg. As will be clearly seen in FIGS. 9 and 10, the forward nose of the front splitter, the rear tips of the two spider leg portions 63 and 69 as well as the channels 65 and 71 at the downstream end of the spider leg have smooth rounded configurations. This substantially eliminates any plastic hang up regions along the spider leg. In addition, overhanging lips 60 and 61 are provided at the upper and lower edges at the forward nose 59 of the spider leg and these lips extend respectively as overhanging lip 67 on spider leg portion 63 and overhanging lip 73 on spider leg portion 69. Once again, there is a curved transition of the overhang lips to the main body portions of the spider leg. Accordingly, these overhanging lips provide smooth guides for directing the flow of plastic onto the splitter and guides of the spider leg.

Although various preferred embodiments of the present invention have been described in detail, it will be appreciated by those skilled in the art, that variations may be made without departing from the spirit of the invention or the scope of the appended claims.

The embodiments of the invention in which an exclusive property or privilege is claimed are defined as follows:

1. A spider for an extruder head, said spider having a plurality of internal plastic flow passages extending axially through said spider and a spider leg between each flow passage, each spider leg having upstream and downstream spider parts to opposite ends of said spider leg, said upstream part presenting a flow splitter which splits flow of plastic to said spider leg into first and second independent plastic streams which flow around said spider leg and said downstream part having a plurality of flow guides staggered at different radial depths in said spider leg, all of said flow guides being directed to guide the independent plastic streams to bond with one another after flowing around the spider leg.

2. A spider for an extruder head, said spider having a plurality of internal plastic flow passages extending axially through said spider and a spider leg between each flow passage, each spider leg having a main body portion and upstream and downstream spider parts to opposite sides of said body portion, said upstream part presenting a flow splitter which splits flow of plastic to said spider leg into first and second independent streams of plastic which flow around said spider leg and said downstream part comprising first and second flow guides staggered at different radial depths in said spider leg, said flow guides each having an edge surface and a face surface, the edge surfaces of both guides being inclined across the axis of the spider leg whereby the edge surface of the first guide directs the first stream of plastic across the face surface of the second guide and the edge surface of the second guide directs the second stream of plastic across the face surface of the first guide to join the first and second independent streams of plastic with one another after passing around the spider leg to form a common stream of plastic downstream of the body portion.

3. A spider as claimed in claim 2, wherein the face surface of each guide comprises a flat surface region bordered by a channel recessed in the face surface.

4. A spider as claimed in claim 3, wherein the channel in the face surface of the first guide is parallel to the edge surface of the second guide and the channel in the face surface of the second guide is parallel to the edge surface of the first guide.

5. A spider as claimed in claim 1, having a multiple piece construction comprising inner and outer spider rings formed separately and held spaced from one another by said spider legs.

6. A spider as claimed in claim 5, including mechanical securing means securing said spider legs to said inner and outer spider rings, said mechanical securing means being releasable from said spider for separation of said spider legs from said inner and outer spider rings.

7. A spider as claimed in claim 1, wherein each of said spider legs has a rounded forward nose and rounded end tips.

8. A spider as claimed in claim 1, wherein each of said spider legs is bordered to opposite sides by an overhanging lip.

9. A spider as claimed in claim 8, wherein said overhanging lip has a curved interior surface.

* * * * *